(12) United States Patent
Saudagar et al.

(10) Patent No.: US 12,376,094 B1
(45) Date of Patent: Jul. 29, 2025

(54) APPARATUS AND METHOD FOR SPECTRUM EFFICIENT CELLULAR V2X TRANSMISSION IN VEHICULAR NETWORKS

(71) Applicant: IMAM MOHAMMAD IBN SAUD ISLAMIC UNIVERSITY, Riyadh (SA)

(72) Inventors: Abdul Khader Jilani Saudagar, Riyadh (SA); Muhammad Awais Javed, Islamabad (PK); Ahmad Naseem Alvi, Islamabad (PK); Hitoun A. Alsagri, Riyadh (SA); Yazeed Masaud Alkhrijah, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/070,372

(22) Filed: Mar. 4, 2025

(51) Int. Cl.
*H04W 72/0453* (2023.01)
*H04W 4/40* (2018.01)
*H04W 72/566* (2023.01)

(52) U.S. Cl.
CPC ......... *H04W 72/0453* (2013.01); *H04W 4/40* (2018.02); *H04W 72/566* (2023.01)

(58) Field of Classification Search
CPC ......... H04W 4/40–48; H04W 72/0453; H04W 72/569
See application file for complete search history.

(56) References Cited

U.S. PATENT DOCUMENTS

2017/0034837 A1\* 2/2017 Lopez-Perez ....... H04W 72/541
2020/0059813 A1   2/2020 Park et al.
(Continued)

FOREIGN PATENT DOCUMENTS

| CN | 107155173 A | 9/2017 | |
|---|---|---|---|
| CN | 113490275 A | * 10/2021 | ............ H04W 16/14 |
| JP | 2023-125202 A | 9/2023 | |

OTHER PUBLICATIONS

Song et al., "Vehicle Networking Broadcast Communication Resource Allocation Method Based on NOMA," English machine translation of CN 113490275 A, Clarivate Analytics, pp. 1-18, (Year: 2025).*

(Continued)

*Primary Examiner* — Thomas R Cairns
(74) *Attorney, Agent, or Firm* — Oblon, McClelland, Maier & Neustadt, L.L.P.

(57) ABSTRACT

An apparatus and a method for performing direct communications between vehicles over a cellular vehicle-to-everything (C-V2X) communication protocol includes for each sub-frame in time domain that has a first number (N) of sub-channels in frequency domain, identifying a second number (M) of vehicles, each vehicle of the M vehicles having a packet to be transmitted during the sub-frame. The method includes determining a remaining time in a delivery deadline of the packet to be transmitted. The method includes estimating a transmitter-receiver distance between the vehicle and a corresponding receiver vehicle at an end of the sub-frame. The method includes identifying 2N vehicles from the M vehicles, based on the remaining times and the transmitter-receiver distances. The method includes pairing the 2N vehicles into N transmission pairs that correspond to the N sub-channels, to maximize a sum of interference distances of direct communications over the N sub-channels.

20 Claims, 8 Drawing Sheets

(56) References Cited

U.S. PATENT DOCUMENTS

2020/0119890 A1\* 4/2020 Yeh ........................... H04L 5/14
2020/0229210 A1 7/2020 Bharadwaj et al.

OTHER PUBLICATIONS

Abdul Rehman, et al., "On the impact of multiple access interference in LTE-V2X and NR-V2X sidelink communications", Sensors 2023, vol. 23, Issue 10, 490, 17 Pages.

Ala Din Trabelsi, et al., "Priority-based scheduling algorithm for NOMA-integrated V2X", Advances in Science, Technology and Engineering Systems Journal, vol. 5, No. 6, Dec. 16, 2020, pp. 1225-1236, 12 Pages.

\* cited by examiner

APPARATUS AND METHOD FOR SPECTRUM EFFICIENT CELLULAR V2X TRANSMISSION IN VEHICULAR NETWORKS

BACKGROUND

Technical Field

The present disclosure is directed to intelligent transportation systems and autonomous driving, and more particularly to an apparatus and a method for spectrum efficient cellular vehicle-to-everything (C-V2X) transmission in vehicular networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Vehicular networks serve as the foundation for many Intelligent Transportation System (ITS) applications, which are envisioned as key enablers of future smart cities. Among these applications, autonomous driving stands out as a transformative technology with the potential to reduce human error, enhance road safety, and improve traffic efficiency. The effectiveness of autonomous vehicles relies heavily on seamless communication and data exchange between vehicles, necessitating robust and reliable network protocols to ensure uninterrupted operations.

The rapid advancement of wireless communication technologies has significantly shaped the evolution of vehicular networks, particularly in the domain of cellular vehicle-to-everything (C-V2X) communication. C-V2X facilitates direct and network-assisted communication between vehicles, infrastructure, pedestrians, and other network entities, enabling critical applications such as autonomous driving, traffic management, and real-time safety services. The C-V2X framework operates over a time-frequency resource grid, where time is divided into sub-frames and frequency into sub-channels. This structured approach optimizes the allocation of limited communication resources, ensuring efficient and reliable data transmission in dynamic vehicular environments.

Long-Term Evolution (LTE) technology has been widely adopted in vehicular networks to manage and optimize resource allocation for data transmission among vehicles. LTE enables efficient distribution of time and frequency resources, allowing vehicles to communicate effectively while navigating complex road conditions. However, as vehicular density increases, contention for sub-channels within the allocated time-frequency grid becomes a major challenge. High vehicle density can lead to excessive competition for resources, resulting in packet collisions, degraded transmission quality, and increased delays in critical communications.

Existing C-V2X systems often lack efficient mechanisms to dynamically prioritize transmissions based on application requirements, such as the urgency of safety-critical messages or interference minimization. Without effective prioritization, communication delays and transmission failures become more frequent, compromising the reliability of vehicular networks. As vehicular connectivity continues to expand, addressing these limitations is crucial to ensuring that C-V2X systems can meet the stringent performance demands of future transportation networks.

Accordingly, it is one object of the present disclosure to provide a system and a method that overcome the limitations of the prior art.

SUMMARY

In an exemplary embodiment, a method for performing direct communications between vehicles over a cellular vehicle-to-everything (C-V2X) communication protocol is described. For each sub-frame in time domain that has a first number (N) of sub-channels in frequency domain, the method includes identifying a second number (M) of vehicles, each vehicle of the M vehicles having a packet to be transmitted during the sub-frame, where both N and M are integers larger than 0, and M>2N. The method includes determining, for each vehicle of the M vehicles, a remaining time in a delivery deadline of the packet to be transmitted. The method includes estimating, for each vehicle of the M vehicles, a transmitter-receiver distance between the vehicle and a corresponding receiver vehicle at an end of the sub-frame. The method includes identifying 2N vehicles from the M vehicles, based on the determined remaining times and the estimated transmitter-receiver distances. The method includes pairing the 2N vehicles into N transmission pairs that correspond to the N sub-channels, so as to maximize a sum of interference distances of direct communications over the N sub-channels, wherein two vehicles within each transmission pair of the N transmission pairs use one corresponding sub-channel of the N sub-channels to transmit packets to their receiver vehicles.

In another exemplary embodiment, an apparatus for performing direct communications between vehicles over a cellular vehicle-to-everything (C-V2X) communication protocol is described. The apparatus includes a processing circuitry. The processing circuitry is configured to, for each sub-frame in time domain that has a first number (N) of sub-channels in frequency domain, identify a second number (M) of vehicles, each vehicle of the M vehicles having a packet to be transmitted during the sub-frame, where both N and M are integers larger than 0, and M>2N. The processing circuitry is configured to determine, for each vehicle of the M vehicles, a remaining time in a delivery deadline of the packet to be transmitted. The processing circuitry is configured to estimate, for each vehicle of the M vehicles, a transmitter-receiver distance between the vehicle and a corresponding receiver vehicle at an end of the sub-frame. The processing circuitry is configured to identify 2N vehicles from the M vehicles, based on the determined remaining times and the estimated transmitter-receiver distances. The processing circuitry is configured to pair the 2N vehicles into N transmission pairs that correspond to the N sub-channels, so as to maximize a sum of interference distances of direct communications over the N sub-channels, wherein two vehicles within each transmission pair of the N transmission pairs use one corresponding sub-channel of the N sub-channels to transmit packets to their receiver vehicles.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
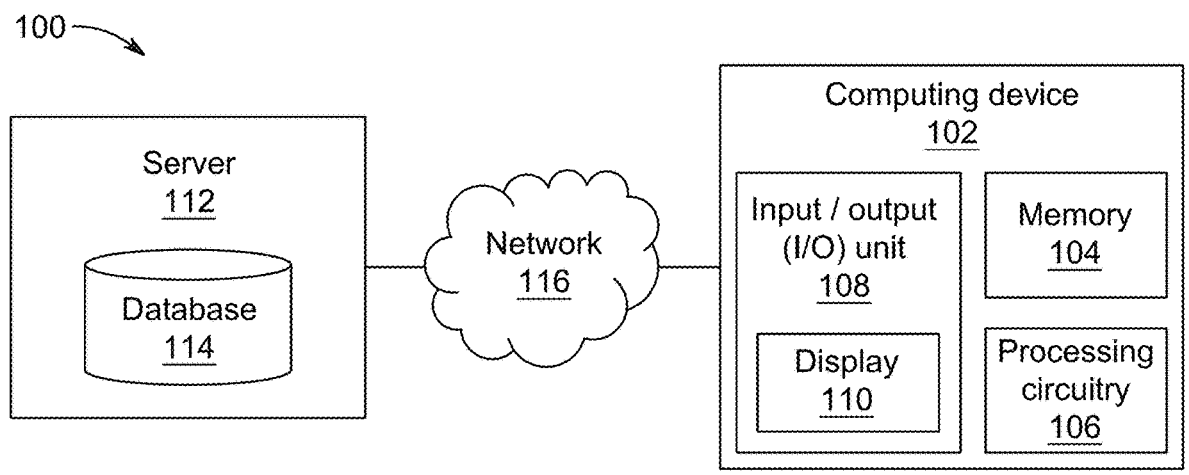
FIG. 1 is an exemplary diagram of an apparatus configured for performing direct communications between vehicles over a cellular vehicle-to-everything (C-V2X) communication protocol, according to certain embodiments.

In the drawings, like reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of this disclosure are directed to an apparatus and a method for performing direct communications between vehicles over a cellular vehicle-to-everything (C-V2X) communication protocol. To perform direct communications between the vehicles, the method includes, for each sub-frame in time domain that has a first number (N) of sub-channels in frequency domain, identifying a second number (M) of vehicles, each vehicle of the M vehicles having a packet to be transmitted during the sub-frame, where both N and M are integers larger than 0, and M>2N. The method also includes, upon identifying these M vehicles, determining, for each vehicle of the M vehicles, a remaining time in a delivery deadline of the packet to be transmitted. The method further includes, once the remaining times are determined, estimating, for each vehicle of the M vehicles, a transmitter-receiver distance between the vehicle and a corresponding receiver vehicle at an end of the sub-frame. Further, the method includes, based on the determined remaining times and the estimated transmitter-receiver distances, identifying 2N vehicles from the M vehicles. Furthermore, the method includes pairing the 2N vehicles into N transmission pairs that correspond to the N sub-channels, so as to maximize a sum of interference distances of direct communications over the N sub-channels, wherein two vehicles within each transmission pair of the N transmission pairs use one corresponding sub-channel of the N sub-channels to transmit packets to their receiver vehicles.

In an embodiment, the present disclosure presents an apparatus and a method to transmit data by efficiently utilizing the available sub-channels in transmission mode 3 of the C-V2X. The method uses the deadline of the transmission and relative mobility of transmitter-receiver vehicle to prioritize the transmissions at every sub-frame. Further, the sub-channels are allocated to a pair of transmissions such that overall interference is minimized. The goal of the proposed method is to efficiently utilize the available transmission resources and maximize the data rate.

In an embodiment, for communication between users and an infrastructure unit (known as eNodeB in Long Term Evolution (LTE)), a radio Uu interface may be utilized. The radio Uu interface is an interface between a user equipment and the infrastructure unit. In an embodiment, for direct communication between the vehicles, a channel on the side link, referred to as a PC5 interface, is employed. The PC5 interface may support two modes of transmission i.e., a transmission Mode 3 and a transmission Mode 4. In an embodiment, the transmission Mode 3 may employ the eNodeB to allocate resources for direct communication between the vehicles. Additionally, the transmission Mode 4 may employ distributed resource allocation without infrastructure. The present disclosure focuses on the transmission Mode 3 (also referred to as a Mode 3 C-V2X protocol), where the eNodeB manages the resource allocation for the PC5 interface, thereby ensuring efficient and reliable direct communication between the vehicles.

Referring now to FIG. 1, the present disclosure provides an exemplary diagram of an apparatus 100 configured for performing direct communications between vehicles over the C-V2X communication protocol, according to certain embodiments. As mentioned previously, the method and apparatus in accordance with embodiments of the present disclosure can be implemented on the eNodeB. Accordingly, the apparatus 100 can be deployed in the eNodeB, for example.

In an embodiment, examples of the vehicles may include, but are not limited to, cars, trucks, motorcycles, buses, bicycles, scooters, and other transportation devices equipped with communication modules capable of supporting C-V2X communication. The vehicles may operate in various environments, such as urban, suburban, or rural areas, and may be used for personal, commercial, or public transportation purposes. Examples of C-V2X communication may include, but are not limited to, vehicle-to-vehicle (V2V), vehicle-to-infrastructure (V2I), and vehicle-to-network (V2N).

In order to facilitate direct communications between the vehicles, the apparatus 100 may include a computing device 102. In some embodiments, the computing device 102 may be an external system. The computing device 102 is configured to perform communication resource scheduling for direct communications between the vehicles over the C-V2X communication protocol. Examples of the computing device 102 may include a desktop, a laptop, a tablet, a smartphone, and the like.

The computing device 102 may include a memory 104 and a processing circuitry 106. The memory 104 may be a volatile memory, such as a Random-Access Memory (RAM), or a non-volatile memory such as a Read Only Memory (ROM), an Erasable Programmable Read Only Memory (EPROM), a flash memory, and the like. The memory 104 may be configured to store one or more computer-readable instructions or routines that, when executed by the processing circuitry 106, may cause the computing device 102 to perform communication resource scheduling for direct communications between the vehicles over the C-V2X communication protocol. In particular, the processing circuitry 106 may be configured to execute the one or more computer-readable instructions stored within the memory 104 to perform communication resource scheduling for direct communications between the vehicles. The processing circuitry 106 may be implemented as one or more microprocessors, microcomputers, microcontrollers, Digital Signal Processors (DSPs), Central Processing Units (CPUs), logic circuitries, and/or any devices that process data based on operational instructions.

To facilitate direct communications between the vehicles over the C-V2X protocol, initially, the processing circuitry 106 is configured to identify a second number (M) of vehicles, for each sub-frame in time domain that has a first number (N) of sub-channels in frequency domain. In an embodiment, each vehicle of the M vehicles has a packet to be transmitted during the sub-frame, where both N and M are integers larger than 0 and M>2N.

Once the second number (M) of vehicles are identified, the processing circuitry 106 may be configured to determine, for each vehicle of the M vehicles, a remaining time in a delivery deadline of the packet to be transmitted. In an embodiment, to determine the remaining times, the processing circuitry 106 may obtain the delivery deadline of the packet to be transmitted for each vehicle of the M vehicles. Upon obtaining the delivery deadline, the processing circuitry 106 may calculate a time interval from the sub-frame to the delivery deadline, as the determined remaining time.

The processing circuitry 106 may be further configured to estimate, for each vehicle of the M vehicles, a transmitter-receiver distance between the vehicle and a corresponding receiver vehicle at an end of the sub-frame. In an embodiment, to estimate the transmitter-receiver distances, the processing circuitry 106 may be configured to obtain, for each vehicle of the M vehicles, a current distance between the vehicle and the corresponding receiver vehicle. Further, the processing circuitry 106 may obtain, for each vehicle of the M vehicles, current speeds of the vehicle and the corresponding receiver vehicle. Based on the current distance, the current speeds, and a duration of the sub-frame, the processing circuitry 106 may estimate the transmitter-receiver distance between the vehicle and the corresponding receiver vehicle at the end of the sub-frame.

Once the transmitter-receiver distances are estimated, the processing circuitry 106 may be configured to identify 2N vehicles from the M vehicles, based on the determined remaining times and the estimated transmitter-receiver distances. In an embodiment, to identify the 2N vehicles, the processing circuitry 106 may be configured to identify a third number (X) of vehicles from the M vehicles based on a pre-defined distance threshold ($D_{th}$). In an embodiment, the pre-defined distance threshold ($D_{th}$) may be defined as a percentage ranging from 30%-60% of a C-V2X communication range. For example, the pre-defined distance threshold ($D_{th}$) may be within a range from 150 meters to 200 meters. In an embodiment, the estimated transmitter-receiver distance for each of the X vehicles may be less than the pre-defined distance threshold, where X is an integer, and M>X>2N. Further, the processing circuitry 106 may be configured to sort the X vehicles based on the determined remaining times of the X vehicles. Once the X vehicles are sorted, the processing circuitry 106 may further select 2N vehicles that have the smallest remaining times from the X vehicles, as the identified 2N vehicles.

The processing circuitry 106 may be configured to pair the 2N vehicles into N transmission pairs that correspond to the N sub-channels. In an embodiment, the pairing is done to maximize a sum of interference distances of direct communications over the N sub-channels. In an embodiment, two vehicles within each transmission pair of the N transmission pairs use one corresponding sub-channel of the N sub-channels to transmit packets to their receiver vehicles. To pair the 2N vehicles into the N transmission pairs, the processing circuitry 106 may be configured to generate an interference distance matrix for the 2N vehicles. In an embodiment, to generate the interference distance matrix, the processing circuitry 106 may be configured to generate a first matrix having 2N rows and 2N columns, where an element $C_{i,j}$ in the first matrix represents a distance between a receiver vehicle corresponding to an i-th vehicle of the 2N vehicles and a receiver vehicle corresponding to a j-th vehicle of the 2N vehicles, with i=1, 2, . . . , 2N and j=1, 2, . . . , 2N. Upon generating the first matrix, the processing circuitry 106 may further determine a maximum value, $C_{max}$, of the elements in the first matrix. Further, the processing circuitry 106 may generate a second matrix having 2N rows and 2N columns as the interference distance matrix, where an element $C'_{i,j}$ in the second matrix is calculated as $C_{max}-C_{i,j}$, with i=1, 2, . . . , 2N and j=1, 2, . . . , 2N. In an embodiment, a value of an element $C_{i,i}$ in the first matrix is set at 0, with i=1, 2, . . . , 2N. Once the interface distance matrix is generated, the processing circuitry 106 may further pair the 2N vehicles into the N transmission pairs by applying a Hungarian algorithm to the interference distance matrix. The complete method of performing communication resource scheduling for direct communications between the vehicles is further explained in detail in conjunction with FIG. 2 to FIG. 8.

The computing device 102 is configured to receive various data (e.g., vehicle location, vehicle speed, vehicle direction, environment information, and the like) from a server 112 or a database 114 over a network 116 to facilitate direct communications between the vehicles. Additionally or alternatively, the computing device 102 can obtain such data directly from the vehicles. Examples of the server 112 may include, but are not limited to, a desktop, a laptop, a tablet, a smartphone, and the like. Examples of the network 116 may include, but are not limited to, a Wide Area Network (WAN), a Local Area Network (LAN), a wireless network, a mobile network, a Virtual Private Network (VPN), an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

The computing device 102 may also include an Input/Output (I/O) unit 108. The I/O unit 108 may be used by the user to provide inputs (such as communication modes information, resource allocation preferences, vehicle data, and the like) to the computing device 102. Further, the I/O unit 108 may include a display 110. The display may be used to display information pertinent to the direct communication between vehicles, such as real-time data about neighboring vehicles, current PC5 interface resource utilization, enodeB-managed resource allocation status in the transmission Mode 3, or warnings and alerts about potential collisions or road hazards based on processing performed by the computing device 102.

Figure 2:
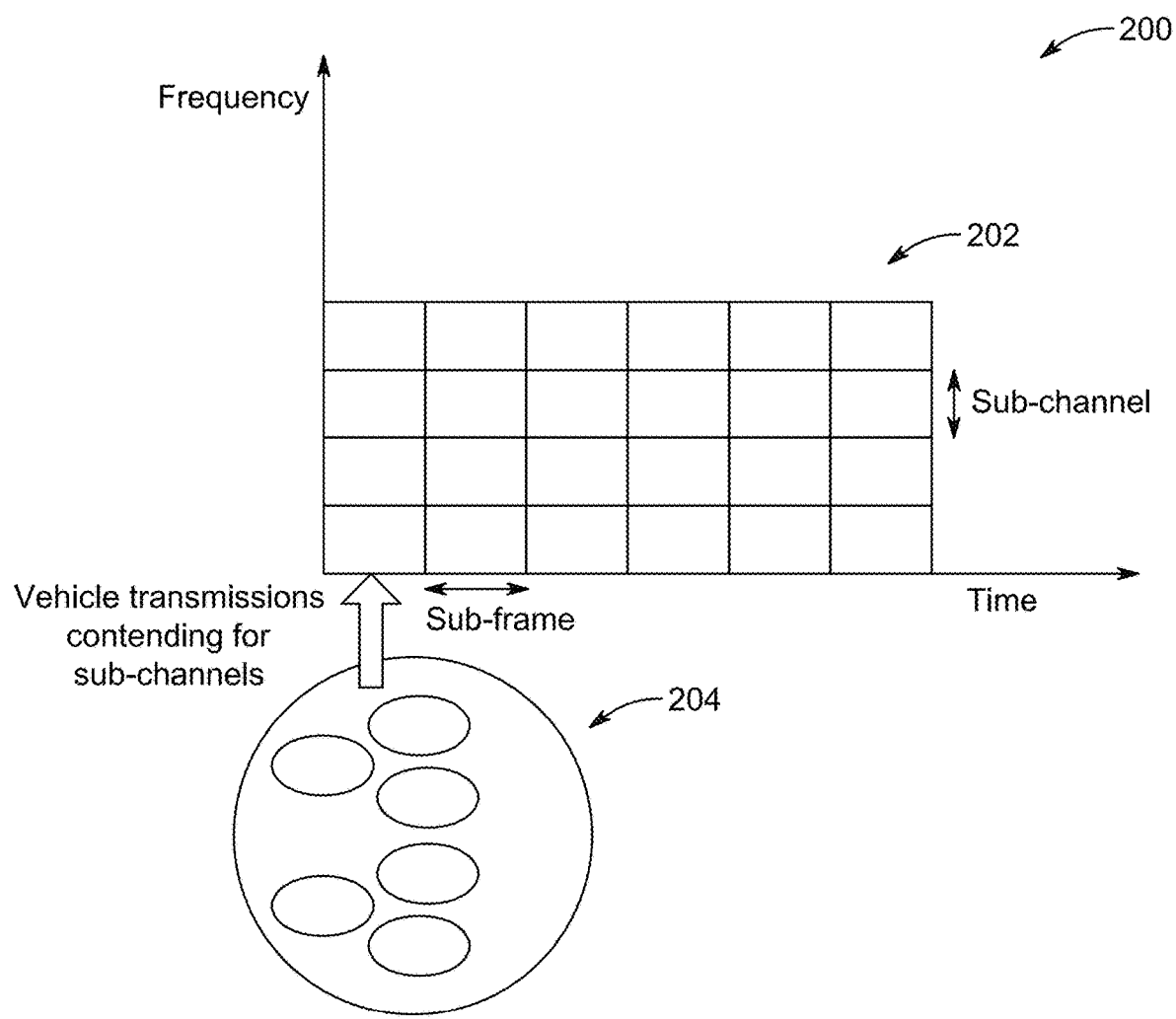
FIG. 2 is an exemplary diagram depicting a C-V2X frame structure for performing direct communications between vehicles over the C-V2X communication protocol, according to certain embodiments.

Referring now to FIG. 2, the present disclosure provides an exemplary diagram depicting a C-V2X frame structure 200 for performing direct communications between vehicles over the C-V2X communication protocol, according to certain embodiments. As depicted in the FIG. 2, the C-V2X frame structure 200 of the computing device 102 includes a time-frequency resource grid 202. In an embodiment, a horizontal axis corresponds to a time domain, divided into sub-frames, each serving as a time slot for data transmission. Further, a vertical axis corresponds to a frequency domain, divided into sub-channels. Each cell within the grid 202 corresponds to a specific sub-channel in a sub-frame, representing the smallest unit of time and frequency resources available for transmission. The eNodeB uses the grid to allocate resources (sub-channels within sub-frames) to vehicles. In particular, vehicles are allocated time and frequency resources to transmit their data. The smallest value of resource allocated to the vehicles is one specific sub-channel (corresponding to the frequency domain) at a given sub-frame (corresponding to the time domain).

FIG. 2 further shows a set of vehicular nodes 204. In an embodiment, the set of vehicular nodes 204 represents vehicle transmissions contending for the sub-channels in a given sub-frame. The major challenge is to select which vehicles may transmit in the sub-channels. The contention occurs as each vehicle aims to transmit its data packets within the allocated resources, ensuring timely delivery and minimal interference. The present disclosure addresses the challenge of selecting vehicles for transmission in the given sub-frame and optimizing resource allocation. In an embodiment, the scheduling is performed by the eNodeB (infrastructure node), operating in Mode 3 of the C-V2X communication. The eNodeB has access to information about the mobility patterns and transmission requirements of all vehicles in the network. The present disclosure maximizes resource utilization by allowing simultaneous transmissions on each sub-channel. To further improve the spectrum efficiency, each sub-channel may be used for more than one transmission to enable concurrent transmissions.

In an operative aspect, initially, for each sub-frame in the time domain that has a first number (N) of sub-channels in the frequency domain, a second number (M) of vehicles may be identified. In an aspect, each vehicle of the M vehicles has a packet to be transmitted during the sub-frame, where both N and M are integers larger than 0, and M>2N.

The remaining time in the delivery deadline of the packet ($T_R$) may be calculated. The remaining time in the delivery deadline of the packet ($T_R$) is calculated using an equation (1) defined below:

$$T_R = T_D - T_C \quad (1)$$

In the equation (1), $T_R$ denotes the remaining time in the delivery deadline of the packet, $T_D$ denotes the delivery deadline time and $T_C$ denotes the current time (which is the time when the packet scheduling is taking place). The value of $T_C$ is updated at the start of each sub-frame. The calculation ensures that packets with the most urgent deadlines are prioritized during resource allocation.

For each vehicle of the M vehicles, the distance between the transmitter vehicle and the receiver vehicle is estimated at the end of the current sub-frame. This is achieved using the two vehicles' current distance, current speeds, and the duration of the sub-frame. The estimated distance may indicate whether the vehicles are moving closer to each other or farther apart, influencing the likelihood of successful transmission.

Based on the determined remaining times and the estimated transmitter-receiver distances, 2N vehicles from the M vehicles may be determined. To further elaborate, in order to identify the top 2N vehicles for transmission, initially, a third number (X) of vehicles is identified from the total M vehicles that have packets to transmit, based on a predefined distance threshold ($D_{th}$). In an embodiment, the estimated transmitter-receiver distance for each vehicle of the M vehicles is evaluated, and only those vehicles whose estimated transmitter-receiver distance is less than $D_{th}$ are retained for further consideration. $D_{th}$ is selected to ensure that the transmitter and receiver vehicles are within a range where reliable data transmission may occur. Typically, $D_{th}$ is chosen to be between 30%-60% of the C-V2X communication range. For instance, if the C-V2X communication range is approximately 300-500 meters, $D_{th}$ may be set between 150 meters and 200 meters. This filtering step results in X vehicles, where X is an integer such that M>X>2N. The present disclosure ensures higher data transmission success rates by retaining only vehicles within the reliable communication range. Once the X vehicles are identified, these vehicles are sorted based on the determined remaining time ($T_R$) of the X vehicles. After sorting, the top 2N vehicles may be selected with the smallest remaining delivery times ($T_R$) from the X vehicles. This ensures that packets nearing their deadlines are given priority for transmission.

Further, the shortlisted 2N vehicles may be paired into N transmission pairs that correspond to the N sub-channels, to utilize the available sub-channels within the sub-frame. In an embodiment, each pair of vehicles is allocated to a single sub-channel to facilitate concurrent transmissions. The pairing may be performed to maximize the interference distance between receiver vehicles so that no collisions may occur at the receiver vehicles. The concept of interference distance between the two receiver vehicles is further explained in conjunction with FIG. 3.

To achieve optimal pairing, a Hungarian algorithm may be employed to pair vehicles so that overall interference distances are maximized. The Hungarian algorithm is applied to solve this resource assignment problem to optimize resource allocation. The Hungarian algorithm is particularly beneficial in scenarios that require efficiently pairing resources to tasks, minimizing costs or maximizing efficiency. In an embodiment, the Hungarian algorithm is employed to ensure optimal vehicle selection for data transmission, efficiently scheduling pairing of vehicle transmissions. The following steps of the Hungarian algorithm for pairing the 2N vehicles and maximizing the interference distance are as follows:

At first step of the Hungarian algorithm, a cost matrix containing 2N rows and 2N columns may be established In an embodiment, the cost matrix containing 2N rows and 2N columns is established by generating two matrices. For example, initially, a first matrix having 2N rows and 2N columns may be generated, where an element $C_{i,j}$ in the first matrix represents a distance between a receiver vehicle corresponding to an i-th vehicle of the 2N vehicles and a receiver vehicle corresponding to a j-th vehicle of the 2N vehicles (with i=1, 2, . . . , 2N and j=1, 2, . . . , 2N). In an example, the diagonal elements $C_{i,i}$ in this first matrix are set to zero to indicate that no interference occurs between the same receiver vehicle. Following this, the maximum value $C_{max}$ in the first matrix is identified. Using this maximum value, a second matrix is generated as the interference distance matrix, where an element $C'_{i,j}$ in the second matrix is calculated as $C_{max} - C_{i,j}$, with i=1, 2, . . . , 2N and j=1, 2, . . . , 2N.

For example, for a first matrix as below:

| 0 | 83 | 69 | 19 |
|---|----|----|----|
| 83 | 0 | 86 | 77 |
| 69 | 86 | 0 | 49 |
| 19 | 77 | 49 | 0 |

86 is identified as the maximum value $C_{max}$. Therefore, the second matrix as below is generated as the cost matrix of the Hungarian algorithm:

| 86 | 3 | 17 | 67 |
|----|---|----|----|
| 3 | 86 | 0 | 9 |
| 17 | 0 | 86 | 37 |
| 67 | 9 | 37 | 86 |

Generating the second matrix from the first matrix converts a maximum cost assignment problem into a minimum cost assignment problem, such that a normal Hungarian algorithm can be applied to solve it. In an embodiment, the second matrix forms the cost matrix for the normal Hungarian algorithm.

At a second step of the Hungarian algorithm, the minimum number in each row is determined and subtracted from all the elements in that row to create at least one zero in each row.

At a third step, the minimum number in each column is determined and subtracted from all the elements of that column, ensuring that each column also contains at least one zero.

At a fourth step, the Hungarian algorithm determines the minimum number of lines required to cover all zero elements in the cost matrix. If the number of lines equals 2N, an optimal assignment is identified along the zero elements. If not, the process moves to the next step.

At a fifth step, the Hungarian algorithm identifies the minimum element that is uncovered by the lines and subtracts this value from all uncovered elements in the matrix. Simultaneously, this value is added to the elements covered by two lines, i.e., at the intersections of horizontal and vertical lines. This step generates additional zeros in the matrix, thus further simplifying the cost matrix.

Further, the fourth and fifth steps involving covering zero elements and matrix adjustments are repeated iteratively until the optimal assignment is achieved.

Finally, at sixth step, the vehicles are paired based on the optimal assignment, maximizing the interference distance for transmission in the current subframe.

For the sake of explanation of how the normal Hungarian algorithm operates, consider an exemplary scenario of four jobs (J1, J2, J3, and J4) that need to be executed by four workers (W1, W2, W3, and W4), one job per worker. The objective is to minimize the total cost of assignment, as shown in the cost matrix below:

|  | J1 | J2 | J3 | J4 |
|---|----|----|----|----|
| W1 | 82 | 83 | 69 | 92 |
| W2 | 77 | 37 | 49 | 92 |
| W3 | 11 | 69 | 5 | 86 |
| W4 | 8 | 9 | 98 | 23 |

The Hungarian algorithm starts by subtracting the row minimum from each row. For example, in the first row, the minimum value is 69. Therefore, subtracting 69 from each element in the first row. The resulting matrix is:

|  | J1 | J2 | J3 | J4 |  |
|---|----|----|----|----|---|
| W1 | 13 | 14 | 0 | 23 | (−69) |
| W2 | 40 | 0 | 12 | 55 | (−37) |
| W3 | 6 | 64 | 0 | 81 | (−5) |
| W4 | 0 | 1 | 90 | 15 | (−8) |

Similarly, the column minimum is subtracted from each column, giving the following matrix:

|  | J1 | J2 | J3 | J4 |
|---|----|----|----|----|
| W1 | 13 | 14 | 0 | 8 |
| W2 | 40 | 0 | 12 | 40 |
| W3 | 6 | 64 | 0 | 66 |
| W4 | 0 | 1 | 90 | 0 |
|  |  |  |  | (−15) |

Now the minimum number of lines (horizontal or vertical) is determined that are required to cover all zeros in the matrix. All zeros may be covered using 3 lines:

|  | J1 | J2 | J3 | J4 |  |
|---|----|----|----|----|---|
| W1 | 13 | 14 | 0 | 8 |  |
| W2 | 40 | 0 | 12 | 40 | x |
| W3 | 6 | 64 | 0 | 66 |  |
| W4 | 0 | 1 | 90 | 0 | x |
|  |  |  | x |  |  |

Since the number of lines (3) is less than the matrix size (n=4), proceed to the next step.

In this step, first, the smallest uncovered number (i.e., 6) is determined, and then this number is subtracted from all uncovered elements and add it to all elements that are covered twice. This results in the following matrix:

|  | J1 | J2 | J3 | J4 |
|---|----|----|----|----|
| W1 | 7 | 8 | 0 | 2 |
| W2 | 40 | 0 | 18 | 40 |
| W3 | 0 | 58 | 0 | 60 |
| W4 | 0 | 1 | 96 | 0 |

Now, return to the previous step. After returning to the previous step, the minimum number of lines is determined as required to cover all zeros in the matrix. Now, there are 4 lines required:

|  | J1 | J2 | J3 | J4 |  |
|---|----|----|----|----|---|
| W1 | 7 | 8 | 0 | 2 | x |
| W2 | 40 | 0 | 18 | 40 | x |
| W3 | 0 | 58 | 0 | 60 | x |
| W4 | 0 | 1 | 96 | 0 | x |

Since the number of lines required (4) equals the matrix size (n=4), an optimal assignment exists among the zeros in the matrix. Therefore, the algorithm stops.

The following zeros cover an optimal assignment:

|    | J1 | J2 | J3 | J4 |
|----|----|----|----|----|
| W1 | 7  | 8  | 0  | 2  |
| W2 | 40 | 0  | 18 | 40 |
| W3 | 0  | 58 | 0  | 60 |
| W4 | 0  | 1  | 96 | 0  |

This corresponds to the following optimal assignment in the original cost matrix:

|    | J1 | J2 | J3 | J4 |
|----|----|----|----|----|
| W1 | 82 | 83 | 69 | 92 |
| W2 | 77 | 37 | 49 | 92 |
| W3 | 11 | 69 | 5  | 86 |
| W4 | 8  | 9  | 98 | 23 |

Thus, worker 1 may perform job 3, worker 2 may perform job 2, worker 3 may perform job 1, and worker 4 may perform job 4. The total cost of this optimal assignment is 69+37+11+23=140.

This approach ensures an efficient and reliable pairing of vehicles for optimal data transmission. The present disclosure aims to improve the data transmissions, network throughput and data rates in the vehicular networks when using C-V2X communications. By employing the Hungarian algorithm, the present disclosure efficiently utilizes the available sub-channels at different sub-frames and schedules a pair of simultaneous transmissions at each sub-channel.

Figure 3:
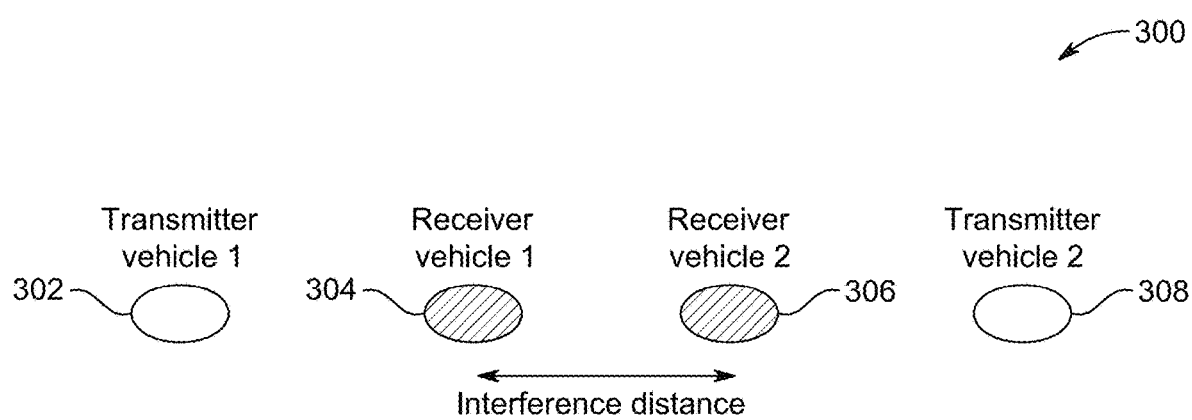
FIG. 3 is an exemplary pictorial representation depicting an interference distance between two receiver vehicles of two transmitter vehicles in a transmission pair, according to certain embodiments.

Referring now to FIG. 3, the present disclosure provides an exemplary pictorial representation 300 depicting an interference distance between two receiver vehicles of two transmitter vehicles in a transmission pair, according to certain embodiments. In an embodiment, the interference distance refers to the distance between two receiver vehicles that are simultaneously receiving transmissions from their respective transmitter vehicles. A larger interference distance may reduce the likelihood of signal collision and improve overall transmission efficiency.

As depicted in the present FIG. 3, a transmitter vehicle 1 302 and a transmitter vehicle 2 308 in one transmission pair, transmit data to their respective receiver vehicle 1 304 and receiver vehicle 2 306. The interference distance plays a critical role in determining the quality and reliability of the data transmission. The interference distance represents a range within which the signals from the transmitter vehicles may overlap or interfere with each other, potentially affecting the performance of the communication. By managing this interference distance, the present disclosure optimizes data transmission between the vehicles, ensuring reduced signal interference and improved communication reliability.

As explained earlier, in order to pair 2N vehicles, the cost matrix of 2N rows and 2N columns is established. The cost matrix is generated from a first matrix that includes the distance between the receiver vehicles (e.g., 304, 306) for the two transmitter vehicles (e.g., 302, 308). The goal of the pairing scheme is to maximize the total interference distance so that no collisions may occur at the receiver vehicles. The total interference distance of the 2N vehicles is maximized by employing the Hungarian algorithm to pair 2N vehicles optimally. The steps of the Hungarian algorithm to pair 2N vehicles are already explained above.

Figure 4:
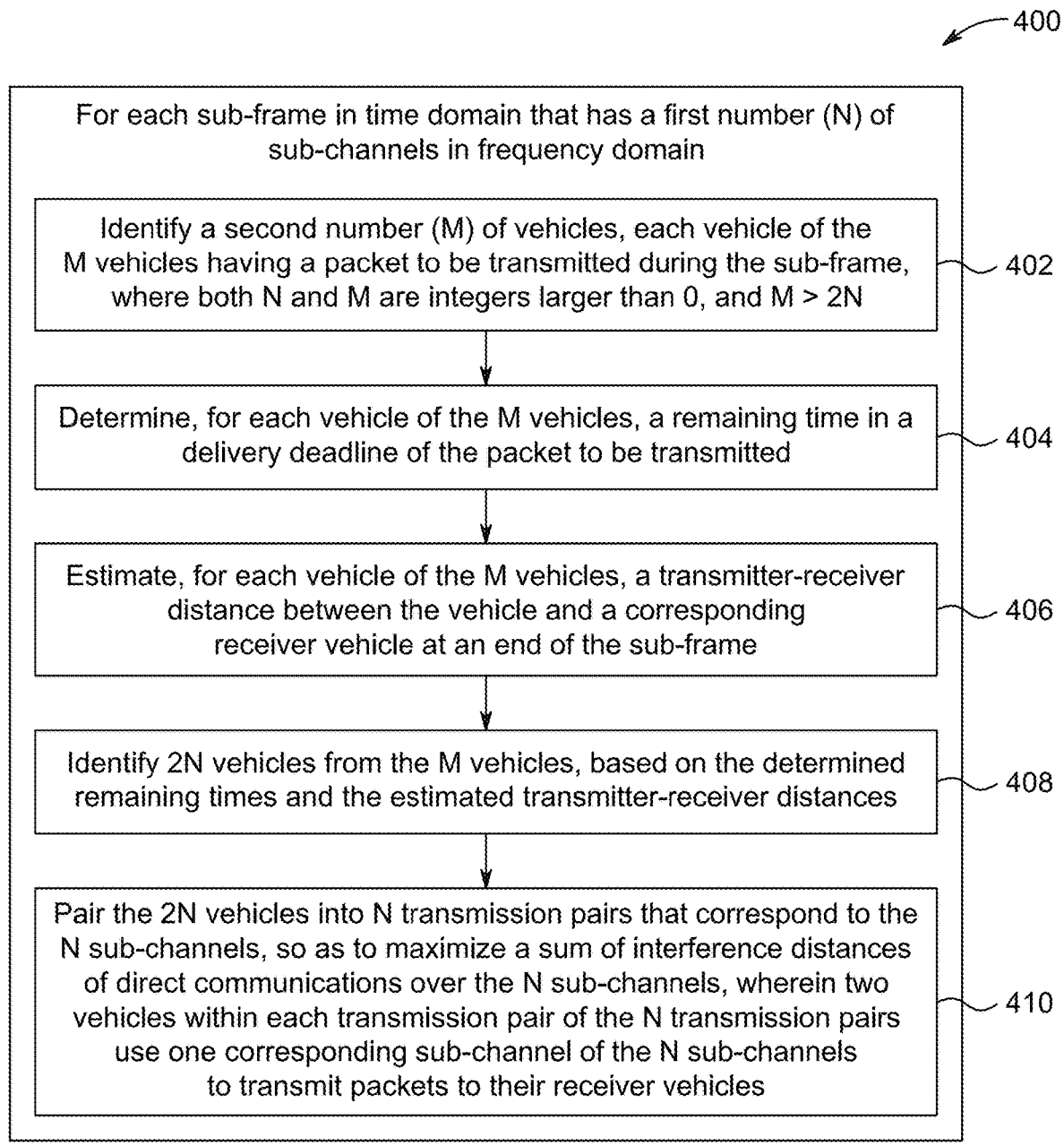
FIG. 4 is an exemplary diagram of a method for performing direct communications between vehicles over the C-V2X communication protocol, according to certain embodiments.

Referring now to FIG. 4, the present disclosure provides an exemplary diagram of a method 400 for performing communication resource scheduling for direct communications between vehicles over the C-V2X communication protocol, according to certain embodiments.

In order to perform direct communications between the vehicles over the C-V2X protocol, for each sub-frame in time domain that has a first number (N) of sub-channels in frequency domain, initially at step 402, a second number (M) of vehicles may be identified. In an embodiment, each vehicle of the M vehicles has a packet to be transmitted during the sub-frame, where both N and M are integers larger than 0 and M>2N.

Once the second number (M) of vehicles is identified, at step 404, for each vehicle of the M vehicles, a remaining time may be determined in a delivery deadline of the packet to be transmitted. In an embodiment, for each vehicle of the M vehicles, to determine the remaining time, first, the delivery deadline may be obtained for the packet to be transmitted. Upon obtaining the delivery deadline, a time interval may be calculated from the sub-frame to the delivery deadline, as the determined remaining time.

Further, at step 406, for each vehicle of the M vehicles, a transmitter-receiver distance between the vehicle and a corresponding receiver vehicle may be estimated at an end of the sub-frame. In an embodiment, to estimate the transmitter-receiver distances, initially, a current distance between the vehicle and the corresponding receiver vehicle may be obtained. Further, current speeds of the vehicle and the corresponding receiver vehicle may be obtained. Based on the current distance, the current speeds, and a duration of the sub-frame, the transmitter-receiver distance between the vehicle and the corresponding receiver vehicle at the end of the sub-frame may be estimated.

Once the transmitter-receiver distances are estimated, at step 408, 2N vehicles from the M vehicles may be identified based on the determined remaining times and the estimated transmitter-receiver distances. In an embodiment, to identify the 2N vehicles, a third number (X) of vehicles may be identified from the M vehicles based on a pre-defined distance threshold ($D_{th}$). In an embodiment, the pre-defined distance threshold ($D_{th}$) may be defined as a percentage ranging from 30%-60% of a C-V2X communication range. For example, the pre-defined distance threshold ($D_{th}$) may be within a range from 150 meters to 200 meters. In an embodiment, the estimated transmitter-receiver distance for each of the X vehicles may be less than the pre-defined distance threshold ($D_{th}$), where X is an integer, and M>X>2N. Further, the X vehicles may be sorted based on the determined remaining times of the X vehicles. Once the X vehicles are sorted, the 2N vehicles that have the smallest remaining times from the X vehicles may be selected, as the identified 2N vehicles.

Further, at step 410, the 2N vehicles may be paired into N transmission pairs corresponding to the N sub-channels. In an embodiment, the pairing is done to maximize a sum of interference distances of direct communications over the N sub-channels. In an embodiment, two vehicles within each transmission pair of the N transmission pairs use one corresponding sub-channel of the N sub-channels to transmit packets to their receiver vehicles. To pair the 2N vehicles into the N transmission pairs, an interference distance matrix may be generated for the 2N vehicles. In an embodiment, to generate the interference distance matrix, a first matrix having 2N rows and 2N columns may be generated. In an embodiment, an element $C_{i,j}$ in the first matrix represents a distance between a receiver vehicle corresponding to an i-th vehicle of the 2N vehicles and a receiver vehicle corresponding to a j-th vehicle of the 2N vehicles, with i=1, 2, . . . , 2N and j=1, 2, . . . , 2N. Upon generating the first matrix, a maximum value, $C_{max}$, of the elements may be determined in the first matrix. Further, a second matrix having 2N rows and 2N columns may be generated as the interference distance matrix, where an element $C'_{i,j}$ in the second matrix is calculated as $C_{max} - C_{i,j}$, with i=1, 2, . . . , 2N and j=1, 2, . . . , 2N. In an embodiment, a value of an element $C_{i,i}$ in the first matrix is set at 0, with i=1, 2, . . . , 2N. Once the interface distance matrix is generated, the 2N vehicles may be paired into the N transmission pairs by applying a Hungarian algorithm to the interference distance matrix.

The present disclosure presents a method for scheduling transmissions using transmission mode 3 of the C-V2X for the vehicular networks. The method enables the eNodeB to make scheduling decisions for direct communication between vehicles using C-V2X. For each sub-frame of the C-V2X, vehicle transmissions are scheduled for the available sub-channels within the sub-frame, ensuring efficient use of spectrum resources. Further, the method enables two simultaneous transmissions on the sub-channel by pairing vehicles, allowing for the efficient utilization of the available spectrum. The scheduling process leverages parameters such as the remaining time in the delivery deadline of the packet and the distance between transmitter-receiver vehicles to identify 2N vehicles that can utilize the N available sub-channels effectively. In an embodiment, a new metric called interference distance is introduced in the method for collision analysis during simultaneous packet transmissions. Using this metric, the Hungarian algorithm is employed to schedule pairs of vehicle transmissions efficiently. The method optimizes the transmission schedule by maximizing the interference distance, significantly reducing collisions and enhancing communication reliability. By prioritizing transmissions based on delivery deadlines and vehicle mobility and minimizing overall interference through intelligent pairing, the method ensures efficient utilization of the available transmission resources. This approach maximizes the data rate while reducing the risk of collisions, thereby improving the performance of vehicular networks.

Figure 5:
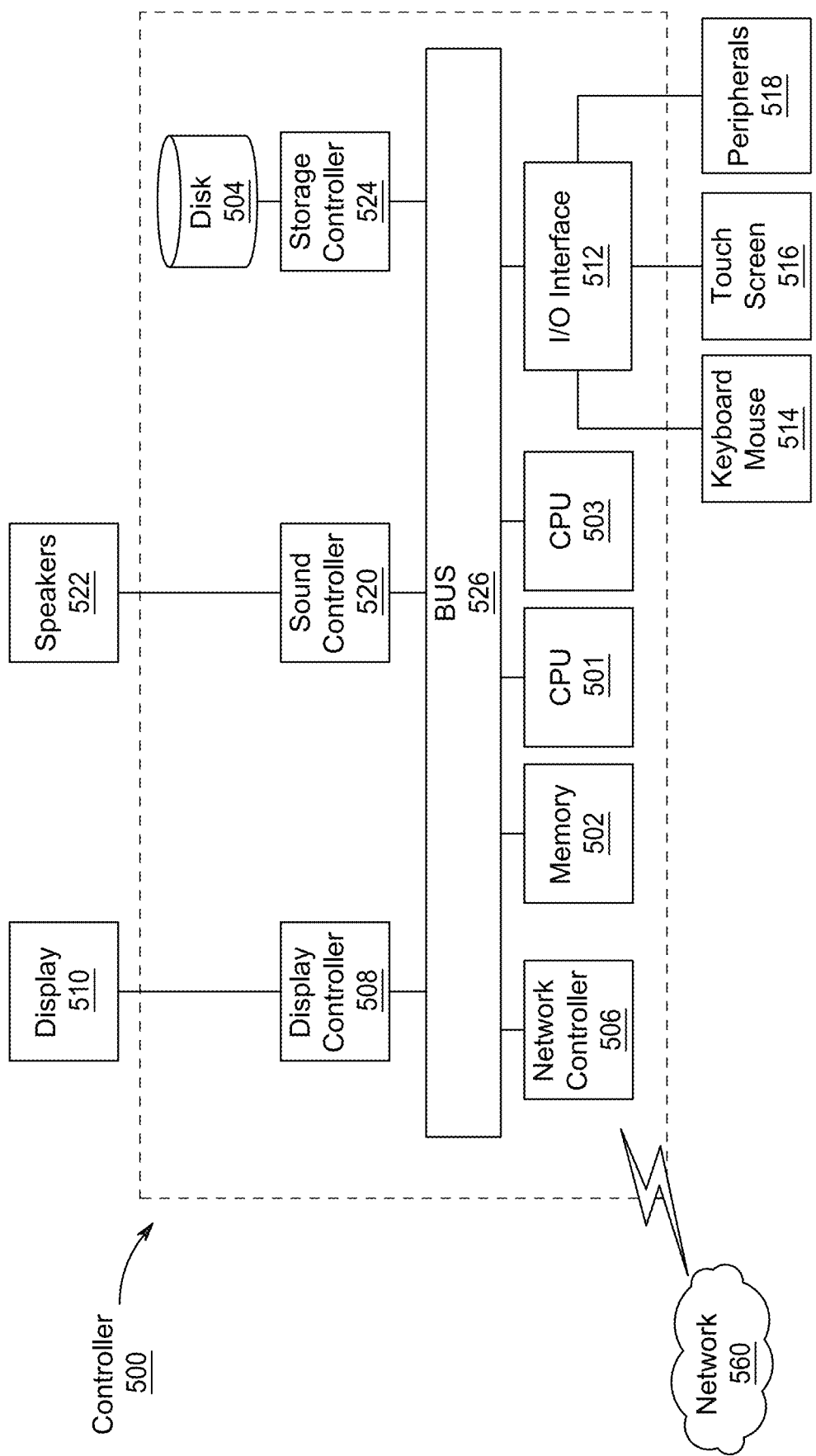
FIG. 5 is an illustration of a non-limiting example of details of computing hardware used in the computing device, according to certain embodiments.

Next, further details of the hardware description of the computing environment according to exemplary embodiments is described with reference to FIG. 5. In FIG. 5, a controller 500 is described as representative of the apparatus 100 of FIG. 1 in which the controller 500 is a computing device which includes a CPU 501 which performs the processes described above/below. The process data and instructions may be stored in a memory 502. These processes and instructions may also be stored on a storage medium disk 504 such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 501, a CPU 503 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 501 or the CPU 503 may be a Xenon or a Core processor from Intel of America or an Opteron processor from Advanced Micro Devices (AMD) of America, or may be other processor types that would be recognized by one of ordinary skill in the art. Alternatively, the CPU 501, the CPU 503 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 501, the CPU 503 may be implemented as multiple processors cooperatively working in parallel to perform the instructions of the inventive processes described above.

The computing device in FIG. 5 also includes a network controller 506, such as an Intel Ethernet Professional (PRO) network interface card from an Intel Corporation of America, for interfacing with a network 560. As can be appreciated, the network 560 can be a public network, such as the Internet, or a private network such as a LAN or a WAN, or any combination thereof and can also include a PSTN or an Integrated Services Digital Network (ISDN) sub-networks. The network 560 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 1008, such as a NVIDIA GeForce Giga Texel Shader eXtreme (GTX) or a Quadro graphics adaptor from a NVIDIA Corporation of America for interfacing with a display 510, such as a Hewlett Packard HPL2445w Liquid Crystal Display (LCD) monitor. A general purpose I/O interface 512 interfaces with a keyboard and/or mouse 514 as well as a touch screen panel 516 on or separate from display 510. The general purpose I/O interface 512 also connects to a variety of peripherals 518 including printers and scanners, such as an OfficeJet or DeskJet from HP.

A sound controller 520 is also provided in the computing device such as a Sound Blaster X-Fi Titanium from Creative, to interface with speakers/microphone 522 thereby providing sounds and/or music.

A general purpose storage controller 524 connects the storage medium disk 504 with a communication bus 526, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 510, keyboard and/or mouse 514, as well as the display controller 1008, the general purpose storage controller 524, the network controller 506, the sound controller 520, and the general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
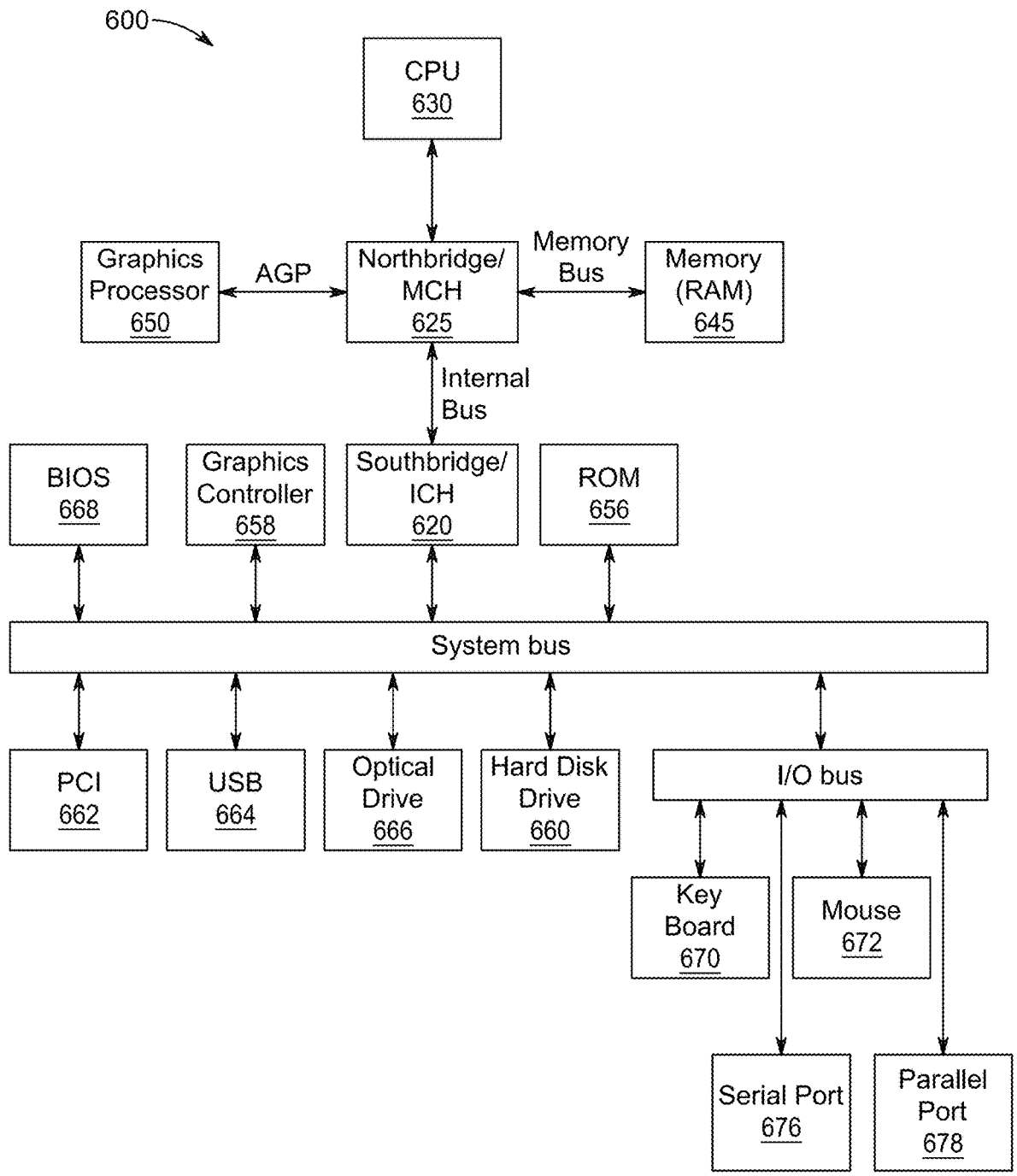
FIG. 6 is an exemplary schematic diagram of a data processing system used within the computing device, according to certain embodiments.

FIG. 6 shows a schematic diagram of a data processing system 600, according to certain embodiments, for performing the functions of the exemplary embodiments. The data processing system 600 is an example of a computer in which code or instructions implementing the processes of the illustrative embodiments may be located.

In FIG. 6, the data processing system 600 employs a hub architecture including a North Bridge and a Memory Controller Hub (NB/MCH) 625 and a south bridge and an I/O Controller Hub (SB/ICH) 620. The CPU 630 is connected to the NB/MCH 625. The NB/MCH 625 also connects to a memory 645 via a memory bus and connects to a graphics processor 650 via an Accelerated Graphics Port (AGP). The NB/MCH 625 also connects to the SB/ICH 620 via an internal bus (e.g., a unified media interface or a direct media interface). The CPU 630 may contain one or more processors and even may be implemented using one or more heterogeneous processor systems.

Figure 7:
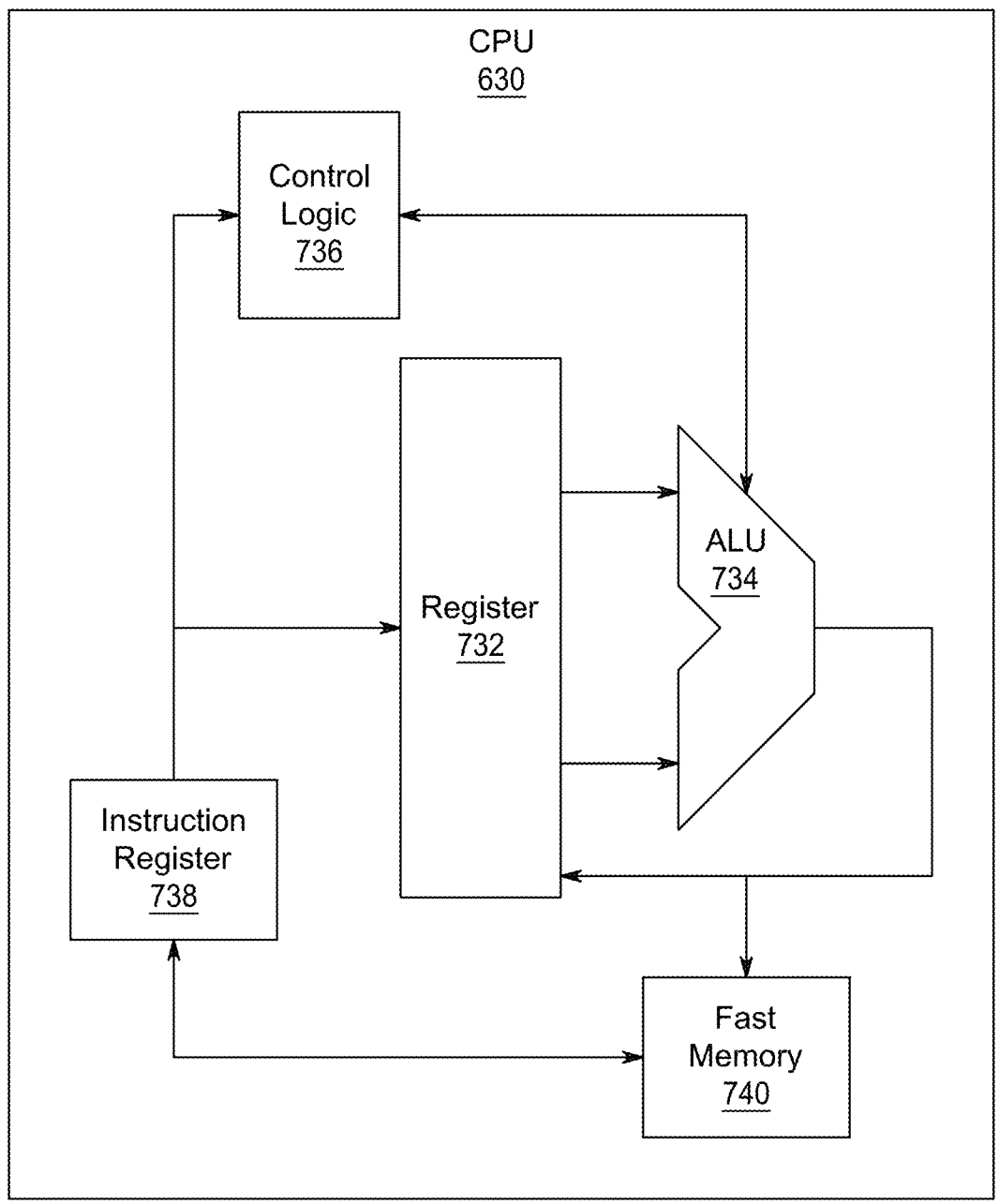
FIG. 7 is an exemplary schematic diagram of a processor used with the computing device, according to certain embodiments.

For example, FIG. 7 shows one implementation of the CPU 630. In one implementation, an instruction register 738 retrieves instructions from a fast memory 740. At least part of these instructions is fetched from the instruction register 738 by a control logic 736 and interpreted according to the instruction set architecture of the CPU 630. Part of the instructions can also be directed to a register 732. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 734 that loads values from the register 732 and performs logical and mathematical operations on the loaded values according to the instructions. The results from these operations can be feedback into the register 732 and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on a Von Neuman model or a Harvard model. The CPU 630 can be a digital signal processor, an FPGA, an ASIC, a Programmable Logic Array (PLA), a PLD, or a Complex Programmable Logic Device (CPLD). Further, the CPU 630 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 6, the data processing system 600 can include that the SB/ICH 620 is coupled through a system bus to an I/O Bus, a ROM 656, a Universal Serial Bus (USB) port 664, a flash Binary Input/Output System (BIOS) 668, and a graphics controller 658. PCI/PCIe devices can also be coupled to SB/ICH 888 through a PCI bus 662.

The PCI devices may include, for example, Ethernet adapters, add-in cards, and Personal Computer (PC) cards for notebook computers. The HDD 660 and an optical drive 666 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 660 and the optical drive 666 can also be coupled to the SB/ICH 620 through a system bus. In one implementation, a keyboard 670, a mouse 672, a serial port 676, and a parallel port 678 can be connected to the system bus through the I/O bus. Other peripherals and devices that can be connected to the SB/ICH 620 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 8:
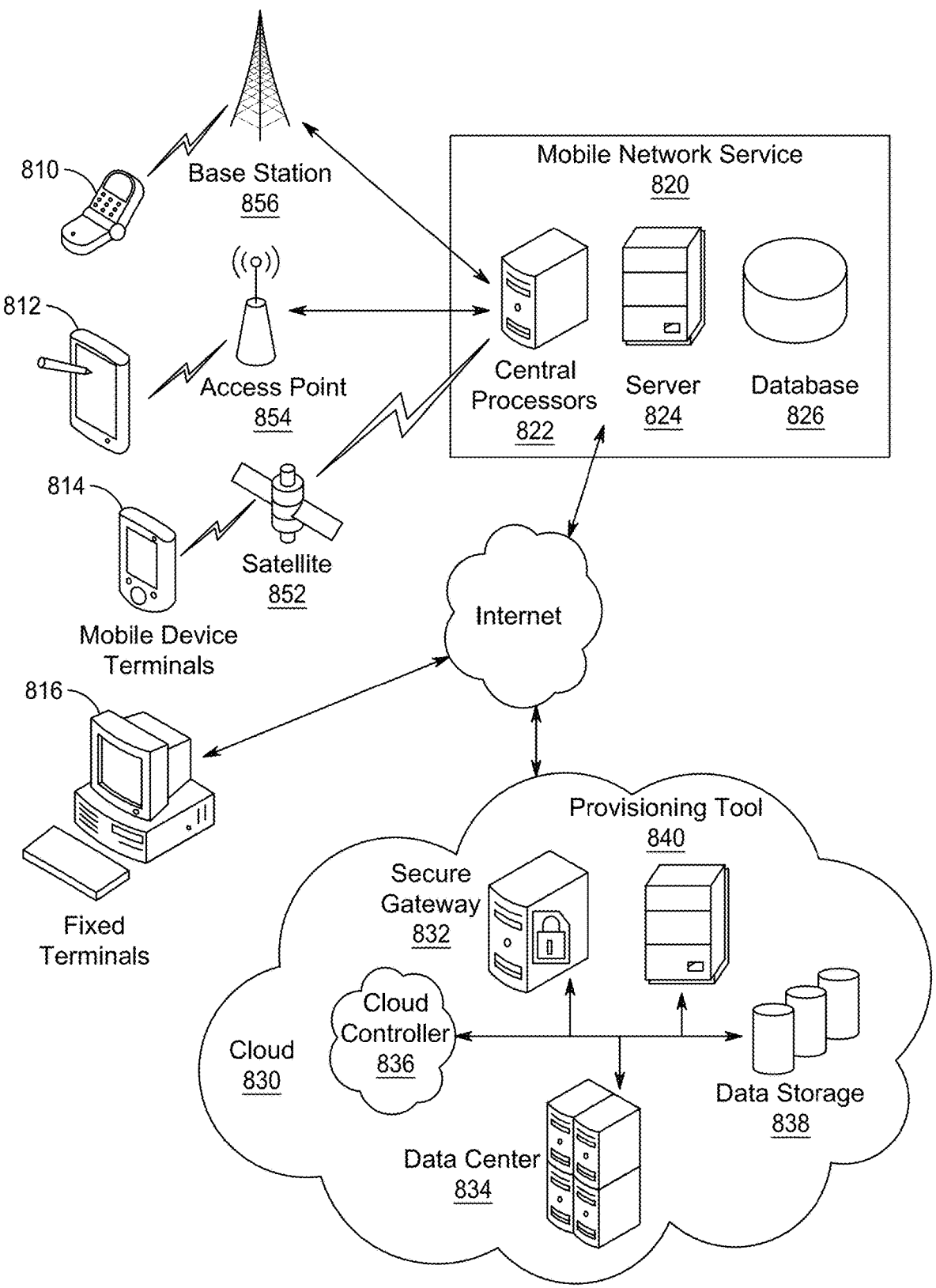
FIG. 8 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 8, in addition to various human interface and communication devices (e.g., display monitors, smart phones, tablets, personal digital assistants (PDAs)). More specifically, FIG. 8 illustrates client devices including a smart phone 810, a tablet 812, a mobile device terminal 814 and fixed terminals 816. These client devices may be commutatively coupled with a mobile network service 820 via a base station 856, an access point 854, a satellite 852 or via an internet connection. The mobile network service 820 may comprise central processors 822, a server 824 and a database 826. The fixed terminals 816 and the mobile network service 820 may be commutatively coupled via an internet connection to functions in cloud 830 that may comprise a security gateway 832, a data center 834, a cloud controller 836, a data storage 838 and a provisioning tool 840. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is, therefore, to be understood that the invention may be practiced otherwise than as specifically described herein.

The invention claimed is:

1. A method for performing direct communications between vehicles over a cellular vehicle-to-everything (C-V2X) communication protocol, comprising:

for each sub-frame in time domain that has a first number (N) of sub-channels in frequency domain,
identifying a second number (M) of vehicles, each vehicle of the M vehicles having a packet to be transmitted during the sub-frame, where both N and M are integers larger than 0, and M>2N,
determining, for each vehicle of the M vehicles, a remaining time in a delivery deadline of the packet to be transmitted, estimating, for each vehicle of the M vehicles, a transmitter-receiver distance between the vehicle and a corresponding receiver vehicle at an end of the sub-frame, identifying 2N vehicles from the M vehicles, based on the determined remaining times and the estimated transmitter-receiver distances, and pairing the 2N vehicles into N transmission pairs that correspond to the N sub-channels, so as to maximize a sum of interference distances of direct communications over the N sub-channels, wherein two vehicles within each transmission pair of the N transmission pairs use one corresponding sub-channel of the N sub-channels to transmit packets to their receiver vehicles.

2. The method of claim 1, wherein the C-V2X communication protocol is a Mode 3 C-V2X protocol, and the steps of identifying the M vehicles, determining the remaining times, estimating the transmitter-receiver distances, identifying the 2N vehicles, and pairing the 2N vehicles are performed at an enodeB.

3. The method of claim 1, wherein the step of estimating the transmitter-receiver distances further comprises, for each vehicle of the M vehicles:
obtaining a current distance between the vehicle and the corresponding receiver vehicle,
obtaining current speeds of the vehicle and the corresponding receiver vehicle, and
based on the current distance, the current speeds, and a duration of the sub-frame, estimating the transmitter-receiver distance between the vehicle and the corresponding receiver vehicle at the end of the sub-frame.

4. The method of claim 1, wherein the step of identifying the 2N vehicles further comprises:
identifying a third number (X) of vehicles from the M vehicles based on a pre-defined distance threshold, the estimated transmitter-receiver distance for each of the X vehicles being less than the pre-defined distance threshold, where X is an integer, and M>X>2N,
sorting the X vehicles based on the determined remaining times of the X vehicles, and
selecting 2N vehicles that have smallest remaining times from the X vehicles, as the identified 2N vehicles.

5. The method of claim 4, wherein the pre-defined distance threshold is defined as a percentage ranging from 30%-60% of a C-V2X communication range.

6. The method of claim 5, wherein the pre-defined distance threshold is within a range from 150 meters to 200 meters.

7. The method of claim 1, wherein the step of determining the remaining times further comprises, for each vehicle of the M vehicles:
obtaining the delivery deadline of the packet to be transmitted, and
calculating a time interval from the sub-frame to the delivery deadline, as the determined remaining time.

8. The method of claim 1, wherein the pairing step further comprises:
generating an interference distance matrix for the 2N vehicles, and
pairing the 2N vehicles into the N transmission pairs by applying a Hungarian algorithm to the interference distance matrix.

9. The method of claim 8, wherein the generating step further comprises:
generating a first matrix having 2N rows and 2N columns, where an element $C_{i,j}$ in the first matrix represents a distance between a receiver vehicle corresponding to an i-th vehicle of the 2N vehicles and a receiver vehicle corresponding to a j-th vehicle of the 2N vehicles, with i=1, 2, . . . , 2N and j=1, 2, . . . , 2N,
determining a maximum value, $C_{max}$, of the elements in the first matrix, and
generating a second matrix having 2N rows and 2N columns as the interference distance matrix, where an element $C'_{i,j}$ in the second matrix is calculated as $C_{max} - C_{i,j}$, with i=1, 2, . . . , 2N and j=1, 2, . . . , 2N.

10. The method of claim 9, wherein a value of an element $C_{i,i}$ in the first matrix is set at 0, with i=1, 2, . . . , 2N.

11. An apparatus for performing direct communications between vehicles over a cellular vehicle-to-everything (C-V2X) communication protocol, the apparatus comprising processing circuitry configured to:
for each sub-frame in time domain that has a first number (N) of sub-channels in frequency domain,
identify a second number (M) of vehicles, each vehicle of the M vehicles having a packet to be transmitted during the sub-frame, where both N and M are integers larger than 0, and M>2N,
determine, for each vehicle of the M vehicles, a remaining time in a delivery deadline of the packet to be transmitted,
estimate, for each vehicle of the M vehicles, a transmitter-receiver distance between the vehicle and a corresponding receiver vehicle at an end of the sub-frame, identify 2N vehicles from the M vehicles, based on the determined remaining times and the estimated transmitter-receiver distances, and
pair the 2N vehicles into N transmission pairs that correspond to the N sub-channels, so as to maximize a sum of interference distances of direct communications over the N sub-channels, wherein two vehicles within each transmission pair of the N transmission pairs use one corresponding sub-channel of the N sub-channels to transmit packets to their receiver vehicles.

12. The apparatus of claim 11, wherein the C-V2X communication protocol is a Mode 3 C-V2X protocol, and the apparatus is deployed at an enodeB.

13. The apparatus of claim 11, wherein the step of estimating the transmitter-receiver distances further comprises, for each vehicle of the M vehicles:
obtaining a current distance between the vehicle and the corresponding receiver vehicle,
obtaining current speeds of the vehicle and the corresponding receiver vehicle, and
based on the current distance, the current speeds, and a duration of the sub-frame, estimating the transmitter-receiver distance between the vehicle and the corresponding receiver vehicle at the end of the sub-frame.

14. The apparatus of claim 11, wherein the step of identifying the 2N vehicles further comprises:
identifying a third number (X) of vehicles from the M vehicles based on a pre-defined distance threshold, the estimated transmitter-receiver distance for each of the X vehicles being less than the pre-defined distance threshold, where X is an integer, and M>X>2N,
sorting the X vehicles based on the determined remaining times of the X vehicles, and
selecting 2N vehicles that have smallest remaining times from the X vehicles, as the identified 2N vehicles.

15. The apparatus of claim 14, wherein the pre-defined distance threshold is defined as a percentage ranging from 30%-60% of a Cellular V2X communication range.

16. The apparatus of claim 15, wherein the pre-defined distance threshold is within a range from 150 meters to 200 meters.

17. The apparatus of claim 11, wherein the step of determining the remaining times further comprises, for each vehicle of the M vehicles:
- obtaining the delivery deadline of the packet to be transmitted, and
- calculating a time interval from the sub-frame to the delivery deadline, as the determined remaining time.

18. The apparatus of claim 11, wherein the pairing step further comprises:
- generating an interference distance matrix for the 2N vehicles, and
- pairing the 2N vehicles into the N transmission pairs by applying a Hungarian algorithm to the interference distance matrix.

19. The apparatus of claim 18, wherein the generating step further comprises:
- generating a first matrix having 2N rows and 2N columns, where an element $C_{i,j}$ in the first matrix represents a distance between a receiver vehicle corresponding to an i-th vehicle of the 2N vehicles and a receiver vehicle corresponding to a j-th vehicle of the 2N vehicles, with i=1, 2, . . . , 2N and j=1, 2, . . . , 2N,
- determining a maximum value, $C_{max}$, of the elements in the first matrix, and
- generating a second matrix having 2N rows and 2N columns as the interference distance matrix, where an element $C'_{i,j}$ in the second matrix is calculated as $C_{max} - C_{i,j}$, with i=1, 2, . . . , 2N and j=1, 2, . . . , 2N.

20. The apparatus of claim 19, wherein a value of an element $C_{i,i}$ in the first matrix is set at 0, with i=1, 2, . . . , 2N.

* * * * *